Sept. 16, 1958        J. K. HAUSNER        2,852,455
ELECTROLYTIC WATER PURFICATION
Filed Oct. 21, 1955        2 Sheets-Sheet 1
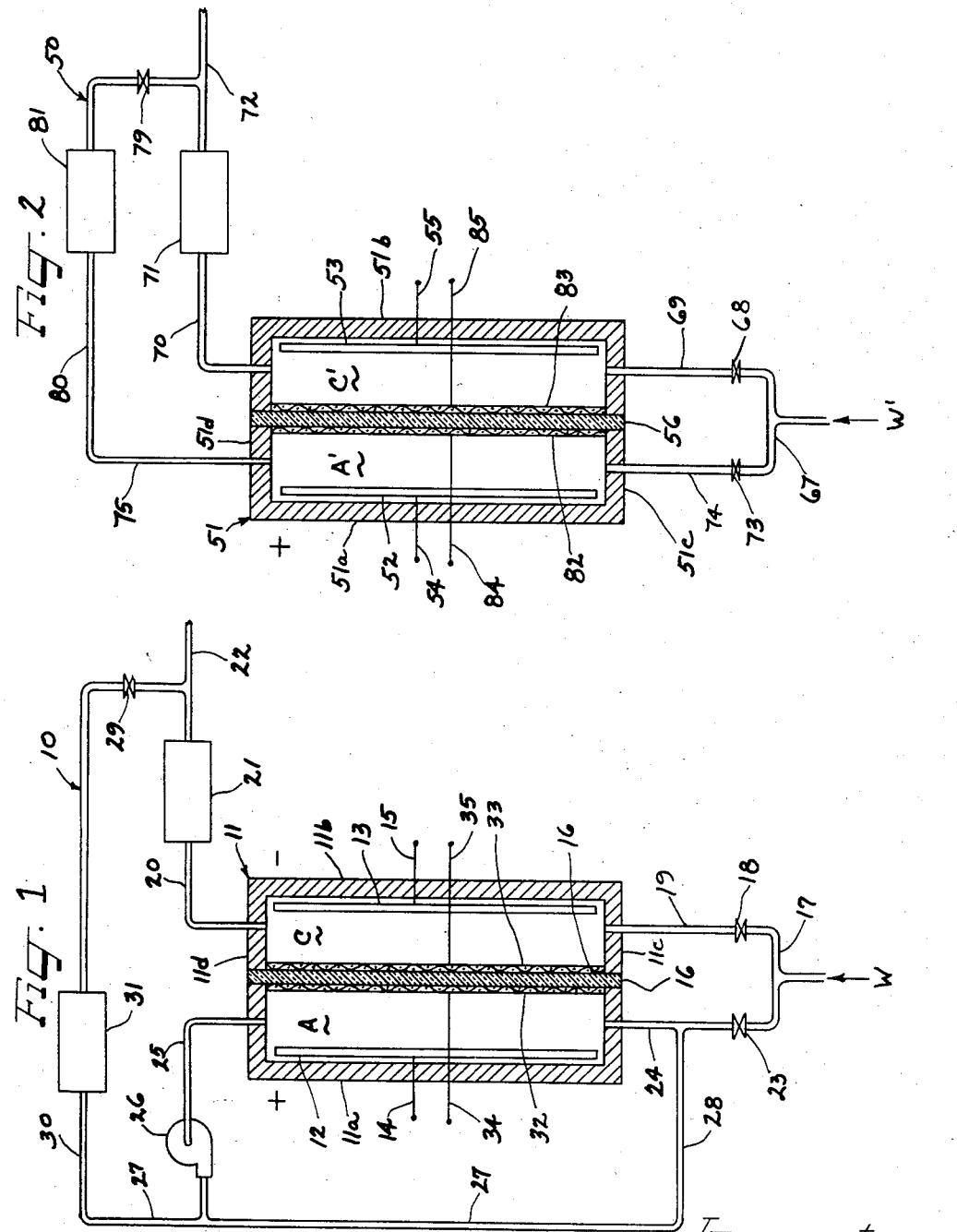
Inventor
JOHANN KARL HAUSNER
by Hill, Sherman, Meroni, Gross & Simpson Attys.

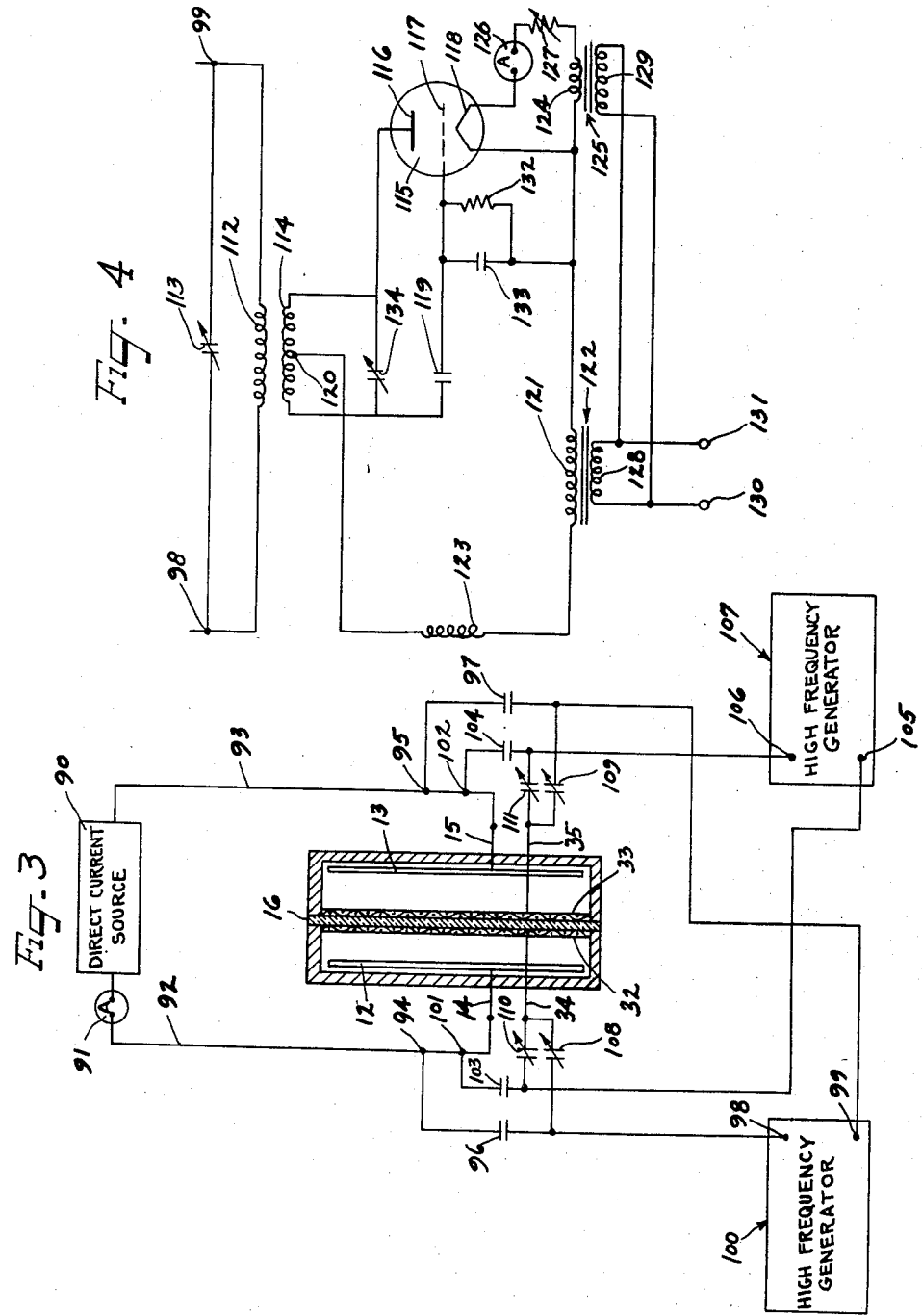

United States Patent Office 2,852,455
Patented Sept. 16, 1958

2,852,455

ELECTROLYTIC WATER PURIFICATION

Johann Karl Hausner, Chicago, Ill.

Application October 21, 1955, Serial No. 541,897

7 Claims. (Cl. 204—151)

This invention relates to the electrolytic purification of water, and more particularly, to an improved method and apparatus for electrolytically purifying waste waters and the like and for the recovery of metals therefrom.

In general, water purification is desirable in a number of industries either to prevent excessive pollution of natural water streams or the like or to minimize the waste of material by recoving certain materials such as metals from the water.

In electrolysis, the electric current is capable, in addition to forcing ions of dissolved molecules through the solvent, of acting in a directive moving manner on certain undissolved substances which are present in the flow path of the current. This phenomenon is known as electro-osmosis, cataphoresis or electrophoresis. Such effects are caused by the fact that in a heterogeneous system having a liquid bordering on a solid or gaseous substance or on another liquid, the two contacting components of the system receive opposite electric charges at their boundary surface. If an electric potential is placed on such a system electrostatic effects occur and the positively charged part of the system moves in the direction of the positive current, while the negatively charged part moves in the direction of the negative current, as in the case of ions of a salt under a potential. In this connection, the nature of the charge depends on the nature of the liquid and the nature of the substances respectively.

In the case of waste waters, these various phenomena are superimposed on each other very strongly and can generally not be controlled. Electrolytic purification of waste waters, in the customary manner, is therefore generally unsuccessful or, at least, can only be carried out under conditions which are not economically feasible.

The electrolytic purification of water and recovery of metals from waste waters, in accordance with the present invention, is obtained by superimposing a high frequency A. C. field on a D. C. field in such a manner that the superimposed high frequency A. C. field is so tuned, by means of intermediate frequencies, that resonance effects are produced in the complex compounds or colloids present in the electrolyte, whereby the individual charge of the molecules to be separated is periodically so weakened that they follow the imposed direct current to a maximum extent with minimum expenditure of energy, so that a practically complete purification of the electrolyte is obtained. The frequency of the high frequency A. C. current is adapted to the nature of the water and the nature of the colloids present, in order to obtain the resonance phenomena. As has been determined in practice, the operating direct current applied is unable to separate the composition of the impurities present in the water, whereby a precipitation with the smallest possible expenditure of energy is possible. In this way, for instance, purely colloidal dyestuff waste waters can be completely clarified.

It is, therefore, an important object of the instant invention to provide an improved method and apparatus for water purification.

It is a further object of the instant invention to provide an improved process of purifying water and recovering metals therefrom, which comprises imposing a D. C. field on the water and superimposing on the D. C. field a high frequency field whose frequency is of a magnitude of 1.8 to 16 meters, expressed in wave lengths in air.

Still another object of the instant invention is to provide an improved system for the purification of water which comprises an anode and a cathode immersed in the water, a pair of conductors for connecting a direct current source to the anode and the cathode, means withdrawing water from adjacent the cathode and filtering the same, means withdrawing water from adjacent the anode and filtering the same, and means for superimposing a high frequency field on the D. C. field created by the direct current between the anode and the cathode.

Other and further objects, features and advantages of the present invention will become apparent to those skilled in the art from the following detailed disclosure thereof and the drawings attached hereto and made a part hereof.

On the drawings:

Figure 1 is essentially a diagrammatic view showing one embodiment of the instant invention;

Figure 2 is essentially a diagrammatic view showing another embodiment of the instant invention;

Figure 3 is a wiring diagram showing a wiring arrangement for use in the practice of the instant invention; and Figure 4 is a wiring diagram showing a high frequency generator adapted for use in the practice of the instant invention.

As shown on the drawings:

In Figure 1 there is shown a system, indicated generally by the reference numeral 10, for the purification of water which comprises a container or cell 11 having left-hand 11a and right-hand 11b side walls and front 11c and rear 11d end walls. An anode 12 extends along the inside of the left-hand wall 11a for substantially the full length and height thereof; and the cathode 13 extends along the inside of the right-hand wall 11b for substantially the full height and length thereof. Conductors or leads 14 and 15 are connected to the anode 12 and cathode 13, respectively, for supplying electric current thereto, as shown more clearly in the wiring diagrams of Figures 3 and 4 which will be explained. The cell 11 is divided lengthwise by a longitudinally extending diaphragm 16 which divides the cell into an anode chamber or compartment A (containing the anode 12) and a cathode chamber or compartment C (containing the cathode 13). The diaphragm 16 is a diaphragm of the type used in the art for electrolysis.

In the operation of the instant device 10 waste water or water to be purified W is fed from a suitable source into an inlet header 17. From the inlet header 17 some water is fed through a valve 18 and an inlet line 19 into the cathode chamber C. The water flows through the cathode chamber C and out an outlet line 20 (positioned adjacent the cathode 13) and then through a filter 21 and into the main outlet header 22. As will be appreciated, dissolved metal salts flowing into the cell 11 are subjected to electrolysis and the metallic cation thereof migrates toward the cathode 13, whereat the cation is converted to the corresponding metal hydroxide, which in the case of polyvalent metals is relatively insoluble and tends to precipitate out. The precipitated metal compounds thus obtained are recovered in the filter 21. Colloidal material which had been remaining in suspension in the water W by virtue of the electrical balance required to maintain such colloidal materials in suspension may also be precipitated in the cathode chamber C because of the disruption of electrical forces surrounding the same and such colloidal materials will also be removed at the filter 21.

The anode chamber A is also fed with the crude or waste water W from the header 17 through a valve 23 and inlet line 24. The water is withdrawn from the anode chamber through an outlet line 25 into a pump 26 which pumps the water into a header 27. Part of the water in the header 27 is recycled back through a recycle line 28 into the inlet line 24, so that a constant recycle portion of the water passing through the anode chamber A is maintained. A valve 29 feeding into the main outlet header 22 controls the amount of water passing out of the anode chamber A that is not recycled. This amount of water is passed through a filter header 30 containing a second filter 31 therein and then through the valve 29. In this manner the water is exposed to the anode chamber conditions for a longer period of time than is employed in the exposure of water to the cathode chamber conditions.

The anode 12 is made of a suitable metal or alloy, such as lead, which may be used effectively and economically and which is substantially inert to any slightly acid pH which might be created in the anode compartment A; and the cathode 13 is also made of a suitable metal or alloy, such as iron or steel (preferably in the form of a grating or screen to afford maximum surface of contact) and the cathode 13 is made of a metal selected to withstand the relatively high pH's which may be generated in the cathode chamber.

The diaphragm 16 is an electrolysis diaphragm, which is a well known type of diaphragm having fine porosity (i. e., a micro-porous diaphragm) so as to reduce the speed of diffusion through the same in both directions. The diaphragm herein is formed of a sintered powdered glass commercially available as an electrolysis diaphragm. It will be appreciated that the electrolysis diaphragm may also be made from clay mixed with sawdust and fired, or parchment. In general, the diaphragm is a microfilter or colloid filter with pore sizes in the range of 1.2 to 14 microns and, as here, preferably about 5 microns.

It will also be noted that the diaphragm 16 is provided with grids or screens 32 and 33 on opposite sides thereof. The grid 32 is positioned in the anode chamber A and substantially covers the exposed surface of the diaphragm 16; while the grid 33 is positioned in the cathode chamber C and substantially covers the exposed surface of the diaphragm 16 in the cathode chamber C. Suitable electric leads or conductors 34 and 35, respectively, are connected to the grids 32 and 33 so that high frequency fields may be superimposed on the D. C. field in the cell 11 across the grids 32 and 33. The grids 32 and 33 may be made of any suitable electrical conductor such as a metal which is substantially inert to the water in the cell 11, as for example stainless steel; and the grids 32 and 33 have an open mesh so as not to interfere in any way with ion migration, but only to interfere in the desired manner with the tendency for electric charges to develop on the exposed surfaces of the diaphragm 16. It has been found that the buildup of electric charges on the diaphragm 16 serves to interfere materially with the orderly migration of ions, so as to require a much greater consumption of electric power in order to obtain electrolysis.

Referring briefly to Figure 2, which shows another embodiment or system 50 differing from the system 10 of Figure 1 primarily in the manner in which water flow is controlled, it will be seen that the system 50 comprises a container or cell 51 having left-hand 51a and right-hand 51b side walls and front 51c and rear 51d end walls. An anode 52 extends along the inside of the left-hand wall 51a for substantially the full length and height thereof; and a cathode 53 extends along the inside of the right-hand wall 51b for substantially the full height and length thereof. Conductors or leads 54 and 55 are connected to the anode 52 and cathode 53, respectively, for supplying electric current thereto, as shown more clearly in the wiring diagrams of Figures 3 and 4 which will be explained. For the purposes of the instant invention the leads 54 and 55 are interchangeable with the leads 14 and 15 of the system 10 (shown in the wiring diagrams of Figures 3 and 4). The cell 51 is divided lengthwise by a longitudinally extending diaphragm 56 which divides the cell into an anode chamber A' (containing the anode 52) and cathode chamber C' (containing the cathode 53). The diaphragm 16 is of the same type of material as the instant diaphragm 56. Also, grids 82 and 83 are provided for opposite sides of the diaphragm 56 with suitable electric leads 84 and 85 therefor. The leads 84 and 85 may be considered to be interchangeable with the leads 34 and 35 in the embodiment 10. One grid 82 is positioned in the anode chamber A' and covers substantially the exposed surface of the diaphragm 56, whereas the other grid 83 is positioned in the cathode chamber C' and covers substantially the exposed surface of the diaphragm 56. The grids 82 and 83 are of the same construction as the grids 32 and 33.

In the operation of the instant device 50 waste water or water to be purified W' is fed from a suitable source into an inlet header 67. From the inlet header 67 some water is fed through a valve 68 and an inlet line 69 into the cathode chamber C'. The water flows through the cathode chamber C' and out an outlet line 70 (positioned adjacent the cathode 53) and then through a filter 71 and into the main outlet header 72. Dissolved metal salts flowing into the cell 51 are subjected to electrolysis and the metallic cation thereof migrates toward the cathode 53, whereat the cation is converted to the corresponding metal hydroxide, which in the case of polyvalent metals is relatively insoluble and tends to precipitate out. The precipitated metal compounds thus obtained are recovered in the filter 21. Colloidal material which had been remaining in suspension in the water W' by virtue of the electrical balance required to maintain such colloidal materials in suspension may also be precipitated in the cathode chamber C' because of the disruption of electrical forces surrounding the same and such colloidal materials will also be removed in the filter 71.

The anode chamber A' is also fed with the crude or waste water W' from the header 67 through a valve 73 and inlet line 74. The water is withdrawn from the anode chamber A' through an outlet line 75 and is then passed through a filter header 80 containing a second filter 81 from which the water flows through a valve 79 into the main outlet header 72. The valve 73 and/or the valve 79 is throttled so that the flow of water through the anode chamber A' is proportionately slower than the flow of water through the cathode chamber C' so as to obtain a comparable water flow system to that indicated in connection with the system 11.

Although either the system 11 or the system 51 may be used in the practice of the instant invention, the main difference therein being in connection with the manner in which the slower flow through the anode chamber is obtained, the subsequent examples relate to the use of the system 11.

The instant process is suited, in particular, for the purification of mixed waters, i. e., waste waters containing, in addition to large amounts of colloids, strong impurities in the form of ions. Waste waters of pickling plants, have a pH of less than 1 and a metal content of 300 milligrams per liter, which are treated by the process of the present invention have, after treatment, a pH of 8 and are entirely free of metals. Furthermore, waste waters from dairies and waste waters from the paper and woodworking industries have been completely purified by the process of the present invention. The waste waters of metal plants, pickling plants, film plants and the like, have a relatively high content of metals as well as a generally low pH. Aside from the fact that these waters destroy the biological function of a sewerage canal, considerable money is lost due to the high metal content of these waste waters. For instance, waste water of a metal plant containing 300 milligrams of heavy metals per liter (such as iron, copper and nickel) and the waste water of a film plant containing an average of 12 milligrams of silver can be treated to economic advantage in the recovery of the metal. By the process of the instant invention, it is possible to recover such metals completely in these plants and further to shift the pH of the treated waste waters to the alkaline side and completely purify the waste waters. The cost of current used in this connection has been extremely little and was more than covered by the value of the metals recovered.

Using pickling waters in the instant cell 11, the pH rises a short time after connecting the current to the cell and superimposing the high frequency fields, with a simultaneous reduction in current consumption. In cleaning pickling plant waste waters, the iron precipitates at a pH of 4 to 6.5, the copper precipitates at a pH of 7.8 and the nickel precipitates at a pH of 8.6. Such precipitation takes place in the form of hydroxides. The voltage applied across the electrodes varies between 0.5 and 4 volts, while the superimposed high frequency fields varied between 50 and 150 million cycles, corresponding to wave lengths between 2 and 6 meters depending upon the condition of the water. After leaving the cell 11 the solutions are clarified in settling vats or filters, such as the filters 21 and 31.

As soon as the liquid has entered the cell, which is under the influence of the A. C. and D. C. fields, it is subjected to electrolysis and electro-osmosis. In this connection, there takes place a separation of the impurities which are to be removed into anions and cations, or in the case of colloids into gels and sols. As a result of the proper tuning of the high frequency field applied, there does not in any case take place a depositing of the materials to be removed on the electrodes. The substances flocculate outside of the cell 11 after passing beyond the field.

While in the case of normal electrolysis a specific potential is necessary in order to obtain a specific electrochemical reaction, which potential effects the deposit of cations and the passing into solution of anions, it is possible with the process and apparatus of the instant invention, by appropriately tuning the superimposed high frequency alternating current field and/or by attaining specific intermediate frequencies, to remain far below the potential ordinarily used. In this way it is possible to obtain, within the solutions, the formation of hydroxides or complex compounds of the separated materials which will deposit from the water or electrolyte in the form of large flocculations (after the electrolyte has emerged from the cell).

*Example 1.*—A sulfite waste liquor of a pulp plant was used containing 400 to 1200 milligrams per liter of dissolved salts such as sodium bisulfite and 30 to 300 milligrams per liter of colloidal material in suspension, plus 30 to 65 milligrams per liter of heavy metals (mainly iron and lead). Three cells were connected in series (with filters inbetween) and the waste liquor was fed through the cells at a rate so as to be retained ten minutes in the three cathode compartments and 30 to 60 minutes in the anode compartments. A D. C. current density of 2½ A. S. F. was maintained across the electrodes (using 0.8 volt and 800 watts per cubic meter). The A. C. frequencies across the electrodes were 3½ and 5 meters in wave length magnitude and across the grids were 12 and 16 meters of wave length magnitude (using a 1200 watt output power transmitter for each). The pH of the crude liquor was 3.2, but the pH in the first cell was 11.4, and in the second cell 11.8, while the pH has reached 12 in the third cell, of the three cathode cells or compartments. The oxidizability of the crude liquor in milligrams per liter was 410,000, but the oxidizability in the first cathode cell and in the second cathode cell was 158,000 and in the third cathode cell it had dropped to 142,000. The oxidizability is the amount of combustibles expressed in milligrams of oxygen per liter required to consume the same and this is an indication of the cellulosic colloidal material in the water. It will be noticed that a distinct reduction therein is obtained. The dried residue or sludge filtered out of the material passing out of the first cathode cell amounts to 7.5 milligrams per liter and the ignition residue thereof is 39.4%. This means that 60.6% was removed as a combustible material, while the remainder comprises metals (or metal oxides) such as iron, calcium and magnesium. The predominant metal is iron and this is an example of the recovery of iron from the waste water. More valuable metals may be recovered in a similar manner. The dry residue filtered out of the water passing out of the third cathode cell is about 10 milligrams per liter and the ignition residue thereof is 49%, again providing a source of metals removed from the water. Cellulosic materials in sol-gel form precipitate as sludges in the anode compartments and are filtered therefrom.

*Example 2.*—Textile waste water having a generally black inky appearance and containing soaps, starches, chlorides (bleach residues) etc. was purified using the instant cell with a current density of ½ to 2 A. S. F. across the electrodes (using 1 to 1.2 volts and 400 watts per cubic meter per 10 minutes treatment). The high frequency fields superimposed on the D. C. field are 3½ and 7 meters in the wave length magnitude (using an outlet power of 1200 watts for the transmitter) and no high frequency field is superimposed across the grids. The results obtained are indicated in Table A below:

Table A

| | Untreated Liquid | After 10 minutes' treatment | |
|---|---|---|---|
| | | Cathode | Anode |
| pH | 7.5 | 10.2 | 2.9 |
| Oxidizability mg./l. | 442.4 | 221.2 | 205.4 |
| Biochemical oxygen want BODs, mg./l. | 38.2 | | |
| Chlorides mg./l. | 124.3 | 134.9 | 195.3 |
| Total hardness, degrees | 18.2 | 4.2 | 12.6 |
| Carbonate hardness, degrees | 2.0 | | |
| Ignition residue of the sludge, percent | None | 35 | |
| Ignition loss, percent | None | 65 | |

*Example 3.*—Using the operating conditions shown in Example 2, with the exception of a current density of 3 A. S. F. across the electrodes and using dyeplant waste water for a time of treatment of 10 minutes, the results obtained are set forth in Table B below:

Table B

| | Untreated Liquid | Cathode | Anode |
|---|---|---|---|
| pH | 2.0 | 11.8 | 4.1. |
| Oxidizability mg./l | 328.6 | 268.6 | 227.5. |
| Chlorides mg./l | 106.5 | 99.4 | 255.6. |
| SO₃ mg./l | 891 | 271 | 514. |
| Suspended substances, cc./l | 3.0 | 33.0 | 300.0. |
| Suspended substances color | brown | brown | gray. |
| Suspended substances form of precipitation | flocculant | flocculant | flocculant. |
| Nitrites | + | + | None. |
| Nitrates | ++ | 0 | Traces. |
| NH₃ | ++ | +++ | ++. |
| Total Hardness, degrees | 14.3 | 5.9 | 5.9. |
| Carbonate hardness, degrees | None | | None. |
| Alkalinity | | 246.0 cc. N/10 hydrochloric acid. | |
| Acidity | 30.0 cc. N/10 sodium hydroxide solution. | | |
| Dry residue mg./l | | 480 | 3,426. |
| Ignition residue, percent | | 73.6 | 57.6. |
| Ignition loss, percent | | 26.4 | 42.4. |
| Analysis of the dry residue: | | | |
| Insoluble, ignited (sand), percent | | | 0.61. |
| Al₂O₃, percent | | | 51.45. |
| As Al(OH)₃, percent | | | 78.7. |
| CaO, percent | | | Traces. |
| Sulfate, percent | | | 19.02. |
| Biochemical oxygen want BOD₅, mg./l | 22.4 | 54.0 | None. |

An advantage of the instant invention is that it permits the use of a current density that varies widely from a minimum of about ½ A. S. F. to a maximum of 20 or 50 A. S. F. (depending upon the conductivity of the water) but the preferred current density is within the range of about 1 to 5 A. S. F. which permits practical operation that is made effective by the superimposing of the high frequency fields.

In general, it is not desirable to use wave lengths lower than 1.8 meters because of problems in generation and control; and the benefits of the invention can be obtained using wave lengths as high as about 16 meters. The wave lengths of each high frequency field differ from one another by a magnitude of about 2 to about 50 or 75% of their average wave length (i. e. the average wave length for the two or more high frequencies); and the wave length magnitudes across the electrodes are about 3 to 8 meters preferably, whereas the wave length magnitudes across the grids are about 10 to 16 meters preferably.

Referring now to Figure 3, reference numeral 90 generally designates a direct current source which has a positive terminal connected through an ammeter 91 and a conductor 92 to the anode lead 14, and a negative terminal connected through a conductor 93 to the cathode lead 15. The source 90 may be any source of steady or pulsating current. Batteries may be used or where standard 25, 50 or 60 cycle alternating current is available, it will ordinarily be preferable to provide rectifiers to convert the alternating current to direct current.

To apply high frequency fields, points 94 and 95 of the conductors 92 and 93 are respectively connected through capacitors 96 and 97 to terminals 98 and 99 of a high frequency generator 100. Points 101 and 102 of the conductors 92 and 93 may be connected through coupling capacitors 103 and 104 to terminals 105 and 106 of a second high frequency generator 107.

Although a high frequency field of a single frequency may be used to substantial advantage in many circumstances, greatly improved results are obtained by using a plurality of fields of different frequencies. For this purpose, the generators 100 and 107 may each have a single frequency output to apply fields of two different frequencies. Preferably, however, the generator 100 is of a special construction (to be described) such that it applies two different frequencies. Hence, when only two different frequencies are needed, only the generator 100 is required and by providing the second generator 107, an additional frequency or plurality of frequencies may be applied. It will, of course, be apparent that additional high frequency generators may be used to advantage in some circumstances.

In order to achieve more efficient application of the high frequency fields to the cell, the terminals 98 and 99 of the high frequency generator 100 are connected through capacitors 108 and 109 to the conductors 34 and 35 connected to the grids 32 and 33, and the terminals 105 and 106 of the high frequency generator 107 are similarly connected through capacitors 110 and 111 to the conductors 34 and 35. The capacitors 108—111 are preferably variable so that they can be adjusted to obtain optimum coupling to the cell.

It will be noted that the high frequency generators are connected in parallel relation to the direct current source. A series coupling could be used but such would necessitate that the direct current source have a very low internal impedance to the high frequency currents to obtain efficient operation, which would be difficult to achieve particularly with the relatively long conductors usually used to connect the direct current source to the electrodes. In addition, it would not be possible with a series coupling to obtain the proper field distribution, but such can be accomplished through the use of the parallel connection and the coupling to the screens 32 and 33 through the capacitors 108–111.

With a parallel coupling such as illustrated, the impedance of the high frequency current path through the precipitation bath should be much less than the impedance of the path through the direct current source. With conductors of substantial length as are usually used to connect the direct current source to the bath, this is achieved to a certain extent by placing the points 94, 95, 101 and 102, at which the high frequency generators are connected to the conductors 92 and 93, relatively close to the anode 12 and cathode 13. If desired, in addition, choke coils may be provided between the terminals of the direct current source and the points at which the high frequency source is connected to the conductors 92 and 93.

A further specific feature of the invention is in the adjustment of the position of the points 94, 95, 101 and 102 to obtain optimum coupling of the high frequency currents to the bath. With frequencies in the ranges previously specified, the conductors 92, 93 can form a transmission line of substantial length as compared to one wave length, and by moving the points 94, 95, 101 and 102, resonant and anti-resonant points (or nodes and anti-nodes) may be found and by using such resonant points, optimum coupling can be achieved. In many cases, points can be found at which the high frequency current path through the bath is resonant with the high frequency path through the direct current source being anti-resonant so that the ideal coupling can be obtained.

When a plurality of high frequency sources, such as the generators 100 and 107, are used it is desirable to prevent direct coupling between the two sources. This may be readily accomplished in the illustrated arrangement, by proper positioning of the points 94, 95 relative to the points 101, 102.

When the arrangement of Figure 2 is used, it will be apparent that the conductors 92 and 93 are connected to the leads 54 and 55; the capacitors 108 and 110 are connected to the lead 84; and the capacitors 109 and 111 are connected to the lead 85.

Figure 4 is a circuit diagram of the high frequency generator 100 and it will be understood that the high frequency generator 107 may use the same circuit. In this circuit, the output terminals 98 and 99 are connected to the terminals of a coil 112 which may have a variable tuning capacitor 113 connected in parallel therewith. The coil 112 is inductively coupled to a tank coil 114 of an oscillator which comprises a triode vacuum tube 115 having a plate or anode 116, a control grid 117 and a directly heated cathode or filament 118. The oscillator may be a series-fed "Hartley" type with the plate 116 being connected to one end of the tank coil 114, with the grid 117 being connected to the other end of the tank coil 114 through a direct current blocking capacitor and with a source of plate supply voltage being connected between a tap 120 on the coil 114 and the filament 118.

A source of direct current may be used for the plate supply but preferably, to eliminate the need for rectifiers, an alternating current supply is used. In particular, the filament 118 is connected to one terminal of a high voltage secondary winding 121 of a transformer 122 and the tap 120 is connected through a choke coil 123 to the other terminal of the winding 121.

To heat the filament 118, one side thereof is connected to one side of a secondary winding 124 of a transformer 125, the other side of the filament being connected through an ammeter 126 and a rheostat 127 to the other side of the winding 124. The transformers 122 and 125 have primaries 128 and 129 connected in parallel to terminals 130 and 131 which may be connected to a suitable source of alternating current, such as a source of 60 cycle, 220 volt current.

Grid-leak bias is preferably used for the oscillator to insure self-starting, the grid 117 being connected through the parallel combination of a resistor 132 and capacitor 133 to the filament 118.

With the coil 112 being tuned by the capacitor 113, it is not necessary to tune the coil 114. However, it may in some circumstances be desirable to tune the coil 114 by means of a variable capacitor 134 connected thereacross.

It will be appreciated that with the oscillator circuit as thus far described, a high frequency field of one frequency may be readily applied to the precipitation bath. As previously indicated, a high frequency field of a different frequency may be applied from a separate oscillator, but the oscillator is preferably of a special construction by which two different frequencies may be simultaneously applied.

It has been found that this highly advantageous result is achieved by using a relatively high degree of coupling between the coils 112 and 114. It is believed that a high degree of coupling results in the generation of two frequencies because of the fact that when two resonant circuits are coupled together with a coefficient of coupling greater than a certain amount, two resonant peaks will exist at frequencies respectively above and below the frequency to which the circuits are tuned (which hereinabove is referred to as the "average" frequency). The oscillator circuit may thus have the greatest degree of amplification at two different frequencies and can operate simultaneously at both frequencies.

If the oscillator output is viewed on an oscilloscope, for example, the wave will have the same general form as is produced by the addition of two sine waves. As is well known, "beat" frequencies may be produced from waves of two different frequencies and such beat frequencies are produced by the oscillator described.

It should be noted that the greater the degree of coupling, the more prominent are the pair of resonant peaks and the greater is the spacing or frequency difference therebetween. Thus the relation of the two frequencies can be adjusted by adjusting the coupling between the coils 112 and 114.

In practice, the coupling is generally adjusted until optimum performance is achieved. In any case, the coupling should be such that the mutual inductance in henrys is substantially greater than $$\frac{R_1 R_2}{w}$$

where $R_1$ is the resistance of one coil in ohms, $R$ is the resistance of the other coil in ohms and $w = 2\pi f$, $f$ being the frequency to which tuned in cycles per second. A coupling of such value is generally termed "critical coupling" and hence the coupling should be substantially greater than critical coupling.

By way of illustrative example and not by way of limitation, the capacitor 113 may have a maximum capacitance of 125 micro-microfarads; the capacitor 119 may be constituted by two vacuum capacitors each having a capacitance of 250 micro-microfarads; the capacitor 133 may have a capacitance of 100 micro-microfarads; the resistor 132 may have a value of 10,000 ohms; the voltage developed across the secondary 121 may be 5,000 volts RMS; and the tube 115 may be an air-cooled high vacuum type with 2,000 watts maximum power output.

It will be understood that modifications and variations may be effected without departing from the spirit and scope of the novel concepts of this invention.

This application is a continuation-in-part of application Serial No. 327,405, filed December 22, 1952.

I claim as my invention:

1. A process of purifying water and recovering metals therefrom, which comprises passing an electric current through the water to create a D. C. field therein and superimposing on the D. C. field a high frequency field whose frequency is of a magnitude of 2 to 6 meters, expressed in wave lengths in air.

2. A process of purifying water and recovering metals therefrom, which comprises passing an electric current through the water between a cathode and an anode to create a D. C. field therein, withdrawing water from adjacent the cathode and filtering the same to remove precipitated metal compounds therefrom and superimposing on the D. C. field at least two high frequency fields whose frequencies, expressed in wave lengths in air, are of a magnitude of 2 to 6 meters.

3. A process of purifying water and recovering metals therefrom, which comprises passing an electric current through the water between a cathode and an anode to create a D. C. field therein, interposing an electrolysis diaphragm between the cathode and the anode, withdrawing water from adjacent the cathode and filtering the same to remove precipitated metal compounds therefrom and superimposing on the D. C. field at least two high frequency fields whose frequencies, expressed in wave lengths in air, are of a magnitude of 2 to 6 meters.

4. A process of purifying water and recovering metals therefrom, which comprises passing an electric current through the water between a cathode and an anode to create a D. C. field therein, interposing an electrolysis diaphragm between the cathode and the anode, withdrawing water from adjacent the cathode and filtering the same to remove precipitated metal compounds therefrom, superimposing on the D. C. field between the anode and the cathode a first plurality of high frequency fields whose frequencies, expressed in wave lengths in air, are of a magnitude of 1.8 to 16 meters and which differ from one another by a magnitude of 2 to 50% of their average wave length, and superimposing on the D.

C. field across the diaphragm a second plurality of high frequency fields whose frequencies, expressed in wave lengths in air, are of a magnitude of 1.8 to 16 meters and which differ from one another by a magnitude of 2 to 50% of their average wave length.

5. In a system for the purification of water, an anode and a cathode in the water, a pair of conductors for connecting a direct current source to the anode and cathode, an electrolysis diaphragm between the anode and the cathode, means withdrawing water from adjacent the cathode and filtering the same, means withdrawing water from adjacent the anode and filtering the same, and at least one source of high frequency current connected in circuit with said conductors and arranged to superimpose on the direct current at least one alternating current whose frequency, expressed in wave lengths in air, is of a magnitude of 1.8 to 16 meters.

6. In a system for the purification of water, an anode and a cathode in the water, a pair of conductors for connecting a direct current source to the anode and cathode, an electrolysis diaphragm between the cathode and the anode, grids on opposite sides of said diaphragm, means withdrawing water from adjacent the cathode and filtering the same, means withdrawing water from adjacent the anode and filtering the same, at least one source of high frequency current having a pair of output terminals, a first pair of capacitors coupling said terminals to said conductors, and a second pair of capacitors connecting said terminals to said grids.

7. In a system for the purification of water, an anode and a cathode in the water, a pair of conductors for connecting a direct current source to the anode and cathode, an electrolysis diaphragm between the anode and the cathode, means withdrawing water from adjacent the cathode and filtering the same, means withdrawing water from adjacent the anode and filtering the same, and a pair of sources of high frequency currents of different frequencies connected between said conductors at points such that resonances are established with maximum current from each source being applied to the water.

References Cited in the file of this patent

UNITED STATES PATENTS

| | | |
|---|---|---|
| 1,162,213 | Bloom | Nov. 30, 1915 |
| 1,980,873 | Niederreither | Nov. 13, 1934 |
| 2,341,356 | Briggs | Feb. 8, 1944 |

FOREIGN PATENTS

| | | |
|---|---|---|
| 215,851 | Great Britain | May 20, 1924 |
| 843,625 | France | Mar. 27, 1939 |
| 629,099 | Great Britain | Sept. 12, 1949 |
| 516,237 | Belgium | Dec. 31, 1952 |
| 905,360 | Germany | Mar. 1, 1954 |